(12) United States Patent
Lavrut et al.

(10) Patent No.: US 6,722,571 B1
(45) Date of Patent: Apr. 20, 2004

(54) DIVISIBLE MODULE CARD WHICH IS RESISTANT TO BENDING STRESSES

(75) Inventors: Eric Lavrut, Orléans (FR); Franck Girot, Courbevoie (FR)

(73) Assignee: Schlumberger Systemes, Montrouge (FR)

( * ) Notice: Subject to any disclaimer, the term of this patent is extended or adjusted under 35 U.S.C. 154(b) by 30 days.

(21) Appl. No.: 10/069,341
(22) PCT Filed: Aug. 22, 2000
(86) PCT No.: PCT/FR00/02355
§ 371 (c)(1), (2), (4) Date: Jun. 7, 2002
(87) PCT Pub. No.: WO01/15077
PCT Pub. Date: Mar. 1, 2001

(30) Foreign Application Priority Data

Aug. 24, 1999 (FR) .............................. 99 10746

(51) Int. Cl.[7] .............................................. G06K 19/06
(52) U.S. Cl. ..................... 235/492; 235/441; 235/486
(58) Field of Search ................. 235/492, 441, 235/486, 487, 380; 361/764

(56) References Cited

U.S. PATENT DOCUMENTS

| | | | | |
|---|---|---|---|---|
| 4,682,270 A | * | 7/1987 | Whitehead et al. | 361/764 |
| 5,166,609 A | * | 11/1992 | Cole et al. | 324/537 |
| 5,536,969 A | * | 7/1996 | Matsuoka | 257/666 |
| 6,115,616 A | * | 9/2000 | Halperin et al. | 455/557 |
| 6,134,776 A | * | 10/2000 | Hoffmeyer | 29/840 |
| 6,376,054 B1 | * | 4/2002 | Langenthal et al. | 428/210 |
| 2003/0173409 A1 | * | 9/2003 | Vogt et al. | 235/492 |

FOREIGN PATENT DOCUMENTS

| | | |
|---|---|---|
| DE | 197 26 203 C1 | 10/1998 |
| EP | 0 521 778 A1 | 1/1993 |
| EP | 0 535 436 A2 | 4/1993 |

OTHER PUBLICATIONS

French Search Report dated May 23, 2000, 1 page.
International Search Report dated Nov. 20, 2000, 1 page.

* cited by examiner

*Primary Examiner*—Thien M. Le
(74) *Attorney, Agent, or Firm*—Rosenthal & Osha L.L.P.

(57) ABSTRACT

This invention concerns a card with a plastic card body (2) and a snap-off module (3) held to the said card body (2), by three ties (12, 13, 14), this snap-off module (3) including, firstly, a substantially rectangular thin plastic body (4) of which one edge (6) in the corner is cut so as to form a means of foolproofing and, secondly, a microcontroller electrically connected to contact pads (5) flush with the surface of the said module (3). The card (1) according this invention is characterized in that a first tie (12) connects the cut foolproofing edge (6) of the module (3) to the card body (2). The invention applies in particular to ISO format smartcards.

10 Claims, 4 Drawing Sheets

ART ANTERIEUR

ART ANTERIEUR

DIVISIBLE MODULE CARD WHICH IS RESISTANT TO BENDING STRESSES

FIELD OF THE INVENTION

This invention concerns cards with a plastic body and a snap-off module held to the said card body by three ties, this snap-off module including, firstly, a substantially rectangular thin plastic body of which one edge in the corner is cut so as to form a means of foolproofing and, secondly, a microcontroller electrically connected to contact pads flush with the surface of the said module.

BACKGROUND OF THE INVENTION

Such cards, often called SIM (Subscriber Identification Module) cards, are mainly intended for the field of mobile telephony where telecommunication network operators demand that the access to the services they propose is only possible through the use of a secured system. In practice, when a member of the public wants to access a telecommunication network, he first purchases a SIM card. This person is then known as a subscriber to the network and has for example access rights which are partly managed by the card.

Once the person has purchased a SIM card, he connects this card to his mobile telephone. Some mobile telephones only accept cards in ISO format, i.e. whose dimensions, approximately 85.6 mm long, 54 mm wide and 0.76 mm thick, are provided for in the standard ISO7816. Other mobile telephones however only accept SIM cards in mini-card format, i.e. whose dimensions, approximately 25 mm long, 15 mm wide and 0.76 mm thick, are provided for in the standard ETSI/GSM11.11. Consequently, depending on the model of mobile telephone that the subscriber has, he may need to detach the snap-off module from the card body in order to insert it in his telephone.

In the prior art shown on FIGS. 1 and 2, module 3 is built into the card body 2 such that the contact pads 5 flush with the surface of the said module 3 are located at the positions defined in the above-mentioned standard ISO7816. The means intended to hold the module 3 to the card body 2 consist of four ties. A large tie 13 connects the width edge opposite the edge in the corner 6 cut so as to form a means of foolproofing, i.e. on the above-mentioned figures the left edge of module 3, to the card body 2 and three ties of reduced width 20, 21 and 22 connect respectively the top edge, the bottom edge and the right edge of the module 3, to the said card body 2. The longitudinal cross-section of these last three ties is highly trapezoidal.

To detach module 3 from a card, the person must exert pressure on the module in order to break the ties of reduced size 20, 21, 22 then bend one or more times the large tie 13 to finally break it. Separation of module 3 is irreversible.

The cards with snap-off module described above in the state of the art technology do not have sufficient mechanical resistance to the dynamic flexions and torsions for them to comply with standards ISO7816-1/ISO10373 which require that cards in ISO format must withstand 500 flexions in the direction of the length with a deflection of 20 mm (FIG. 3A) then 500 flexions in the direction of the width with a deflection of 10 mm (FIG. 3B). In fact, when such cards are subject to 500 dynamic flexions in the direction of the length, tie 22 undergoes a maximum elongation of approximately 100% and, when these cards are subject to 500 dynamic flexions in the direction of the width, tie 21 undergoes a maximum elongation of approximately 181%.

A maximum elongation of 100% for a given tie means that part of this tie suffers a theoretical maximum elongation consistent with its length being doubled. In practice, the tie snaps before reaching the 500 flexions.

Moreover, in spite of the fact that they offer insufficient resistance to the flexions and torsions, the snap-off modules of the cards using the state of the art technology are no easier to detach from the card body considering the presence of four ties.

We may also mention the patent application EP 0 521 778 A1 which concerns the manufacture of smartcards. To reduce the cost of manufacturing smartcards in smaller format than usual, all manufacturing steps including the testing and the printed personalisation of the visible surfaces of the card are carried out on a card of standard format. At the end of the process a card of reduced format is blanked from the standard card. A partial pre-cut is made along a line, either by thinning the card all around the perimeter of the reduced format card, or by a slit following this perimeter, this slit being interrupted locally to leave temporary supporting bridges between the reduced format card and the remainder of the standard card.

Patent DE 0 535 436 A2 concerns a smartcard including a detachable module. This module is connected to the card body by ties and at least one attachment element. When the ties are broken, the module keeps the same position in its housing due to the attachment element.

Patent DE 197 26 203 C1 concerns a smartcard including a card body in which there is a substantially rectangular and irreversibly detachable module. The limit between the card body and the module is cut around virtually all the perimeter. The part of the contour which is not cut is a line which is scored slightly. Opposite this scored linear area there is a triangular notch.

SUMMARY OF THE INVENTION

Also, a problem which the invention proposes to solve concerns the realisation of cards with a plastic card body and a snap off module held to the said card body by a first and a second lateral tie, this snap-off module including, firstly, a substantially rectangular thin plastic body the having a beveled edge so as to form a means of foolproofing and, secondly, a microcontroller electrically connected to contact pads flush with the surface of the said module, the said cards offering greater resistance to stresses under flexion and under torsion than the similar cards in the state of the art technology.

The proposed solution of the invention to the above-mention problem concerns a card characterised in that the snap-on module is in addition held to said card by an angular tie, the said angular tie connecting the bevelled edge of the module to the card body.

BRIEF DESCRIPTION OF THE DRAWINGS

It will be easier to understand the invention on reading the non limiting description below, written with reference to the accompanying drawings, where.

DETAILED DESCRIPTION

The cards 1 according to the invention have a card body 2 and a module 3.

Figure 1:
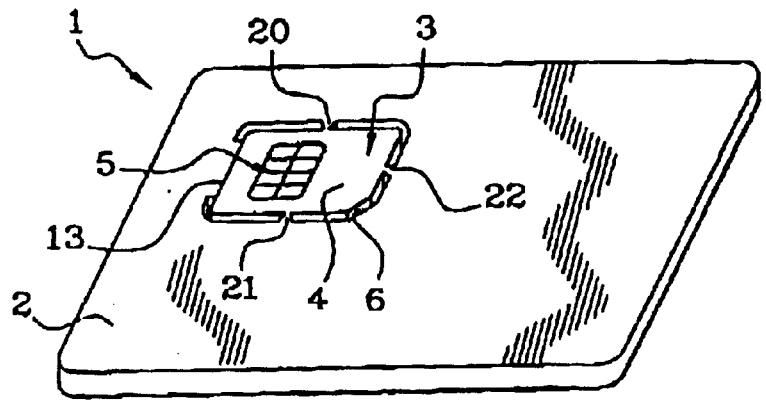
FIG. 1 shows, in perspective, a card according to the prior art.
Figure 2:
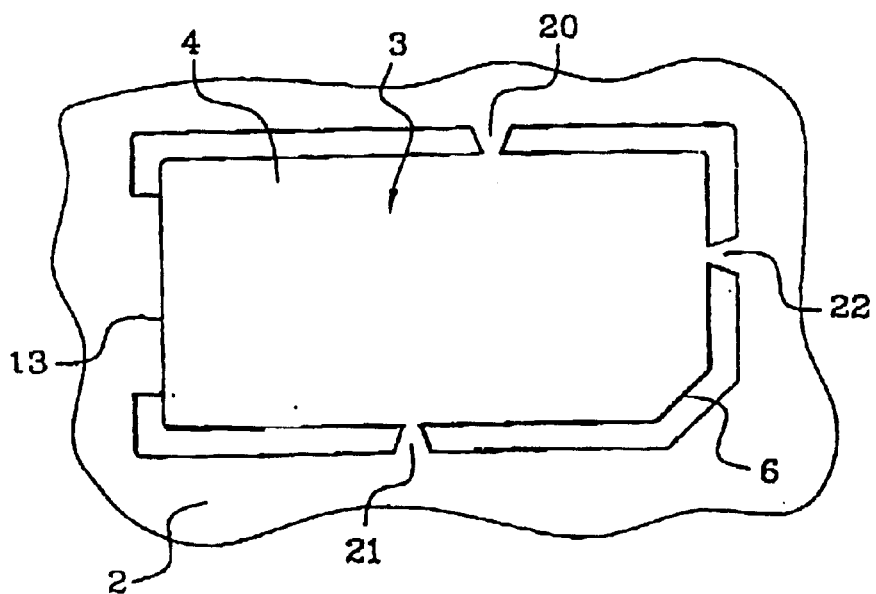
FIG. 2 details, in plan view, a snap-off module of a card according to the prior art.

The body 2 of a card according to the invention is conform with the body 2 of cards according to the prior art, as shown on FIG. 1. It therefore forms substantially a thin right parallelepiped whose dimensions, defined in standard ISO7816 whose content is incorporated in this description by giving the reference, are approximately 85.6 mm long, 54 mm wide and 0.76 mm thick. It is plastic, especially thermoplastic for example formed from a polyvinyl chloride (PVC), an acrylonitrile butadiene styrene (ABS) a polyethylene terephtalate (PET) a polycarbonate (PC) or a mixture of these thermoplastics. It generally has a multilayer structure, the various layers being welded or glued together during known methods used to manufacture cards including in particular hot roll bonding.

Module 3 is a snap-off module. It includes, firstly, a module body 4 and, secondly, a microcontroller electrically connected to contact pads 5 flush with the surface of the said module 3.

The characteristics of the module body 4 are defined especially in standard ETSI/GSM11.11. It forms substantially a thin right parallelepiped whose dimensions are approximately 25 mm long, 15 mm wide and 0.76 mm thick, i.e. the same thickness as that of the card body 2. One edge at the corner of the module is cut off at 45° so as to form a means of foolproofing for its positioning in the sense recto-verso during connection to the electrical terminals of a connector on a terminal provided for this purpose. So this edge is a beveled edge. In the remainder of this description the bevelled edge is referred to as cut edge 6. The width edge of module 3, in direct continuity with cut edge 6, is the right edge 7 of module 3. The width edge of module 3, opposite the cut edge 6, is the left edge 8 of module 3. The length edge of module 3, in direct continuity with cut edge 6, is the bottom edge 9 of module 3. The length edge of module 3, opposite the cut edge 6, is the top edge 10 of module 3.

Like the card body 2, the module body 4 is made from plastic, especially thermoplastic for example formed from a PVC, an ABS a PET, a PC or a mixture of these thermoplastics. It generally has a multilayer structure, the various layers being welded or glued together during known methods used to manufacture cards. In practice, the module body 4 is identical, as regards its thickness and the chemical materials composing it, to the card body 2. This results from the fact that, to manufacture the card according to the invention, a classical card is manufactured and then a punched cut 11 is made which partially separates the module 3 from the card body 2. This punched cut 11 has a constant width of approximately 1 mm. It is obtained through the use of punching tools.

According to the invention, module 3 is held to the card body 2 by three ties and, advantageously, by three ties only. A first tie 12 connects the cut edge 6 of the module 3 to the card body 2, a second tie 13 connects the left edge 8 of the module 3 to the card body 2 and a third tie 14 connects the top edge 10 of the module 3 to the said card body.

The second tie 13 connects the left edge 8 of the module 3, along almost all of the said edge 8. In practice, this tie 13 is centred along edge 8 and has a length of between 10 and 11 mm. On the top side of the card which has the contact pads, it has a score 15 which simplifies the breaking of the said tie 13 when the module 3 is to be detached.

The first 12 and third 14 ties are ties of reduced width. In practice, their width is approximately one millimeter. Their cross section in the longitudinal direction is for example trapezoidal or constant, rectangular.

Figure 4:
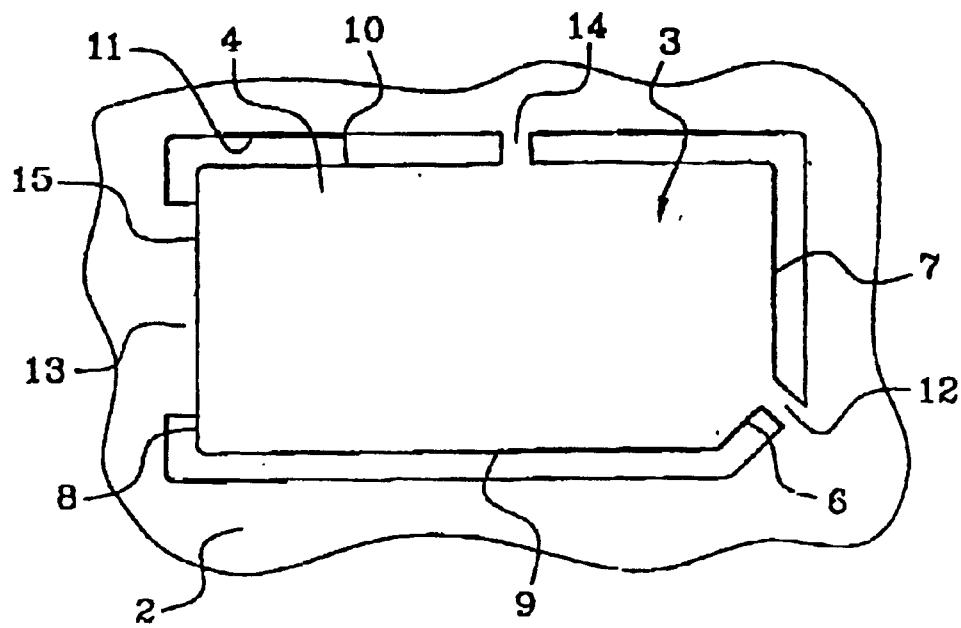
FIGS. 4, 5 and 6, detail, in plan view, three modes of realisation of a snap-off module of a card according to the invention.

In the mode of realisation of the invention shown on FIG. 4, the ties have the following characteristics.

The first tie 12 connects the top part of the cut edge 6 to the card body 2. It is perpendicular to the said edge 6. Its width is approximately one millimeter and its longitudinal cross section is constant rectangular or slightly trapezoidal.

The second tie 13 is substantially centred along edge 8 and has a length of approximately 12 mm. It has a cut 15.

The third tie 14 is substantially centred along the top edge 10. It is perpendicular to the said edge 10. Its width is approximately one millimeter and its longitudinal cross section is constant rectangular or slightly trapezoidal.

Figure 3A:
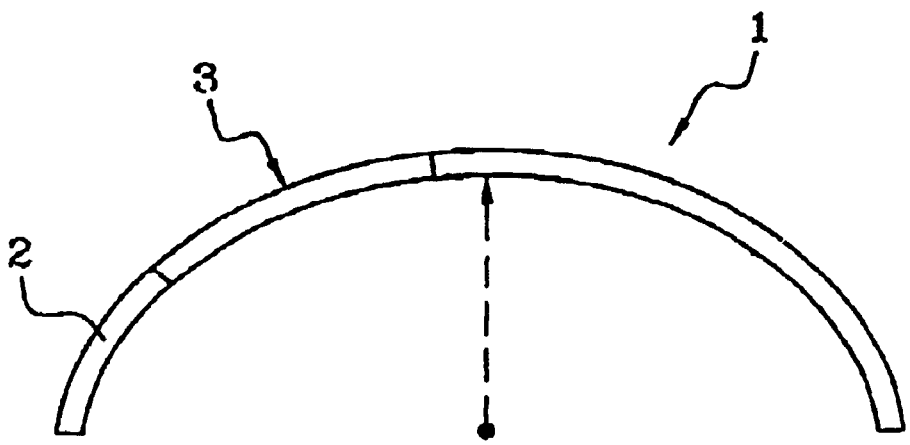
FIGS. 3A and 3B schematise, in cross section, the flexion tests provided for by the standard ISO7816-1/ISO10373.
Figure 3B:
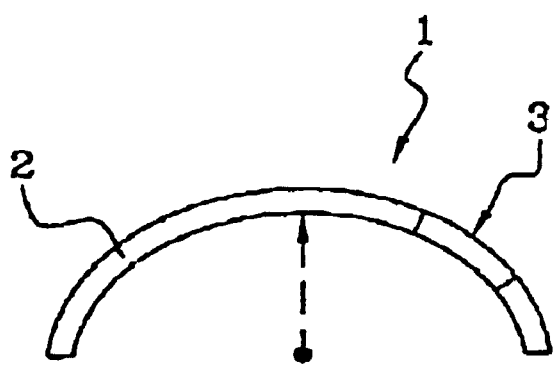

Equipped with such ties, module 3 of the above-mentioned mode of realisation displays, when it is subject to 500 dynamic flexions in the direction of the length (FIG. 3A), a maximum elongation of approximately 15% on the first tie 12 and, when it is subject to 500 dynamic flexions in the direction of the width (FIG. 3B), a maximum elongation of approximately 21% on the third tie 14. These maximum elongations are not sufficient to cause the thermoplastic ties concerned to break. A card whose module is equipped with ties according to this mode of realisation therefore withstands the 500 dynamic flexions in the direction of the length and in the direction of the width required by the standard ISO7816-1/DIN10373.

Note that if, with respect to the mode of realisation on FIG. 4, the first tie 12 does not connect the cut edge 6 to the card body 2, but the right edge 7 to the said body 2, the maximum elongation, which was approximately 15% on this first tie 12 reaches a value of 33%.

Figure 5:
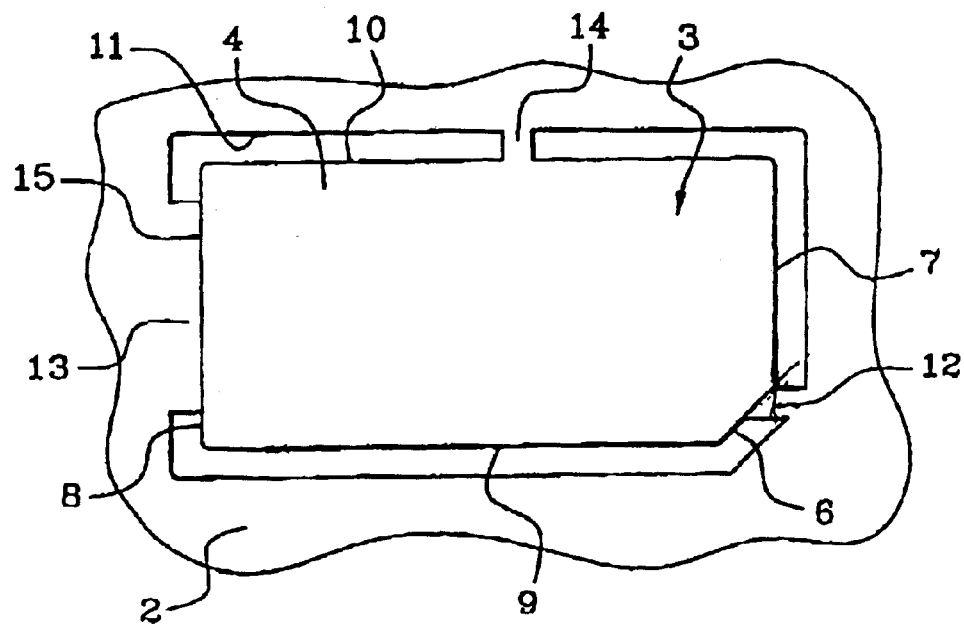

In the mode of realisation of the invention shown on FIG. 5, the ties 12, 13, 14 have the same characteristics as the ties 12, 13, 14 of the mode of realisation on FIG. 4, apart from the first tie 12 which this time is parallel to the bottom 9 and top 10 edges of the module 3.

In this mode of realisation, card 1 displays, when it is subject to 500 dynamic flexions in the direction of the length, a maximum elongation of approximately 20% on the first tie 12 and, when it is subject to 500 dynamic flexions in the direction of the width, a maximum elongation of approximately 22% on the third tie 14. As previously, these maximum elongations are not sufficient to cause the ties 12, 14 concerned to break. A card 1 according to the invention, whose module is equipped with ties described above, therefore withstands the 500 dynamic flexions in the direction of the length and in the direction of the width required by the standard ISO7816-1/ISO10373.

Figure 6:
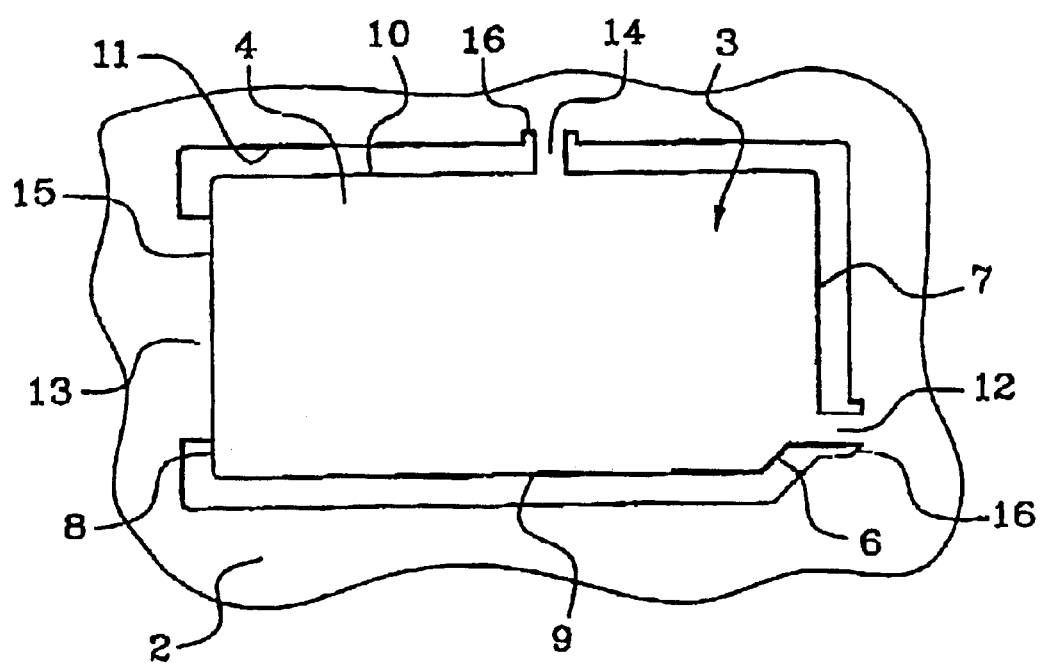

In the mode of realisation of the invention shown on FIG. 6, the ties 12, 13, 14 have the same characteristics as the ties 12, 13, 14 of the mode of realisation of FIG. 5, apart from the fact that the first 12 and third 14 ties are extended towards the card body 2, since the said body 2 has at the position of the said ties 12, 14 a notch 16 which has a depth of approximately 1 mm.

In this mode of realisation, card 1 displays, when it is subject to 500 dynamic flexions in the direction of the length, a maximum elongation of approximately 16% on the first tie 12 and, when it is subject to 500 dynamic flexions in the direction of the width, a maximum elongation of approximately 15% on the third tie 14. These maximum elongations are not sufficient to cause the ties 12, 14 concerned to break. A card 1 according to the invention, whose module 3 is equipped with ties 12, 14 described above, therefore withstands the 500 dynamic flexions in the direction of the length and in the direction of the width required by the standard ISO7816-1/ISO10373.

Note that, if the ties are extended towards module 3, i.e. if it is module 3 which has notches like the notches 16, the aforementioned value of 15% becomes 71%, which is considerable.

In conclusion, compared with the state of the art, the fact of having a first tie 12 connected directly to the cut edge 6 considerably improves the resistance of the card to the dynamic flexions. Moreover, the presence of this tie limits the opening of module 3 with respect to the card body 2 during the flexions in the direction of the length, openings which could lead to a relative deformation of module 3 with respect to the card body 2 and prevent the correct insertion and withdrawal of the card 1 in read terminals for ISO format cards.

What is claimed is:

1. A card comprising a plastic card body and a snap-off module held to the plastic card body by a first and a second lateral tie, this snap-off module comprising, firstly, a substantially rectangular thin plastic body having a bevelled edge so as to form a means of foolproofing and, secondly, a microcontroller electrically connected to contact pads flush with the surface of the said module, wherein the snap-off module is in addition held to the said card body by an angular tie, the said angular tie connecting the bevelled edge of the module to the card body.

2. The card according to claim 1, wherein the snap-off module is held to the card body only by three ties.

3. The card according to claim 1, wherein the first lateral tie connects the width edge of the module opposite the bevelled edge to the card body along almost all of the said width edge.

4. The card according to claim 1, wherein the second lateral tie connects the length edge of the module opposite the bevelled edge to the card body.

5. The card according to claim 4, wherein the second lateral tie is substantially centred along the length edge.

6. The card according to claim 1, wherein the angular tie connects the top part of the bevelled edge (6) to the card body (2).

7. The card according to claim 1, wherein the angular tie is perpendicular to the bevelled edge.

8. The card according to claim 1, wherein the angular tie and second lateral tie are ties of reduced width measuring approximately one millimeter whose longitudinal cross section is constant, rectangular.

9. The card according to claim 1, wherein the angular tie and the second lateral tie are extended towards the card body.

10. The card according to claim 1, wherein the first lateral tie connects the width edge of the module opposite the bevelled edge to the card body and in that the second lateral tie connects the length edge of the module opposite the bevelled edge to the card body.

* * * * *

UNITED STATES PATENT AND TRADEMARK OFFICE
CERTIFICATE OF CORRECTION

PATENT NO. : 6,722,571 B1 Page 1 of 1
DATED : April 20, 2001
INVENTOR(S) : Laurut et al.

It is certified that error appears in the above-identified patent and that said Letters Patent is hereby corrected as shown below:

Title page,
Item [*] Notice, delete "30 days" and insert -- 106 days --.

Signed and Sealed this

Nineteenth Day of April, 2005

JON W. DUDAS
*Director of the United States Patent and Trademark Office*